(12) United States Patent
Ribeiro Carneiro De Araujo et al.

(10) Patent No.: US 12,209,525 B2
(45) Date of Patent: Jan. 28, 2025

(54) METHOD FOR MEASURING FLUID INJECTION

(71) Applicant: VITESCO TECHNOLOGIES GmbH, Regensburg (DE)

(72) Inventors: Antonio Ribeiro Carneiro De Araujo, Toulouse (FR); Valentin Geoffroy, Toulouse (FR); Fabrice Corbin, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/261,544

(22) PCT Filed: Jan. 17, 2022

(86) PCT No.: PCT/EP2022/050861
§ 371 (c)(1),
(2) Date: Jul. 14, 2023

(87) PCT Pub. No.: WO2022/157109
PCT Pub. Date: Jul. 28, 2022

(65) Prior Publication Data
US 2024/0309787 A1    Sep. 19, 2024

(30) Foreign Application Priority Data
Jan. 22, 2021    (FR) ..................... 2100610

(51) Int. Cl.
*F01N 3/20*  (2006.01)
*F01N 3/36*  (2006.01)
(Continued)

(52) U.S. Cl.
CPC ........... *F01N 3/208* (2013.01); *G07C 5/0808* (2013.01); *G07C 5/0816* (2013.01); *F01N 3/206* (2013.01);
(Continued)

(58) Field of Classification Search
CPC combination set(s) only.
See application file for complete search history.

(56) References Cited

U.S. PATENT DOCUMENTS 9,062,807 B2   6/2015   Offenhuber et al.
2008/0276601 A1*  11/2008   Katou .................... F01N 11/00
                                                                 60/287

(Continued)

FOREIGN PATENT DOCUMENTS

DE    102012200917 A1   7/2013
EP         2034147 A1   3/2009
EP         2660437 A1   11/2013

OTHER PUBLICATIONS

International Search Report and Written Opinion of the ISA for PCT/EP2022/050861 mailed Mar. 30, 2022, 13 pages.

*Primary Examiner* — Binh Q Tran
(74) *Attorney, Agent, or Firm* — NIXON & VANDERHYE

(57) ABSTRACT

A method for measuring the injected mass of a fluid containing urea using a system for injecting the fluid into an exhaust system of a vehicle, in which injecting the fluid includes sequences of series of injections of fluid contained in an accumulator between sequences for starting the pump upon detection of a pressure below a threshold $P_{ON}$ and sequences for stopping the pump upon detection of a pressure above a threshold $P_{OFF}$, the method particularly includes computing the injected mass using the complete circuit hydraulic stiffness, based on the hydraulic stiffness $K_D$ of the accumulator and the hydraulic stiffness $K_I$ of the remainder of the circuit, and includes comparing the computed injected mass with a setpoint injected mass.

20 Claims, 4 Drawing Sheets

(51) Int. Cl.
  *F01N 11/00* (2006.01)
  *G07C 5/08* (2006.01)
(52) U.S. Cl.
  CPC .............. *F01N 3/36* (2013.01); *F01N 11/002* (2013.01); *F01N 11/005* (2013.01); *F01N 2610/1433* (2013.01); *F01N 2610/1453* (2013.01); *F01N 2610/146* (2013.01); *F01N 2900/04* (2013.01); *F01N 2900/0402* (2013.01); *F01N 2900/0412* (2013.01); *F01N 2900/1808* (2013.01); *F01N 2900/1822* (2013.01)

(56) References Cited

U.S. PATENT DOCUMENTS

| | | | |
|---|---|---|---|
| 2010/0005871 A1* | 1/2010 | Kitazawa | F01N 3/206 60/295 |
| 2012/0000189 A1* | 1/2012 | Wang | F01N 3/208 60/286 |
| 2013/0186470 A1 | 7/2013 | Offenhuber et al. | |
| 2013/0213014 A1* | 8/2013 | Ohno | F01N 3/2066 60/277 |
| 2013/0283771 A1 | 10/2013 | Nagata | |
| 2014/0053537 A1* | 2/2014 | Yan | F01N 3/2066 137/12 |
| 2019/0178132 A1* | 6/2019 | Sundararajan | F01N 3/208 |
| 2019/0186328 A1* | 6/2019 | Takemoto | F01N 9/00 |
| 2020/0116060 A1* | 4/2020 | Suzuki | F01N 3/208 |

* cited by examiner

[Fig. 1]
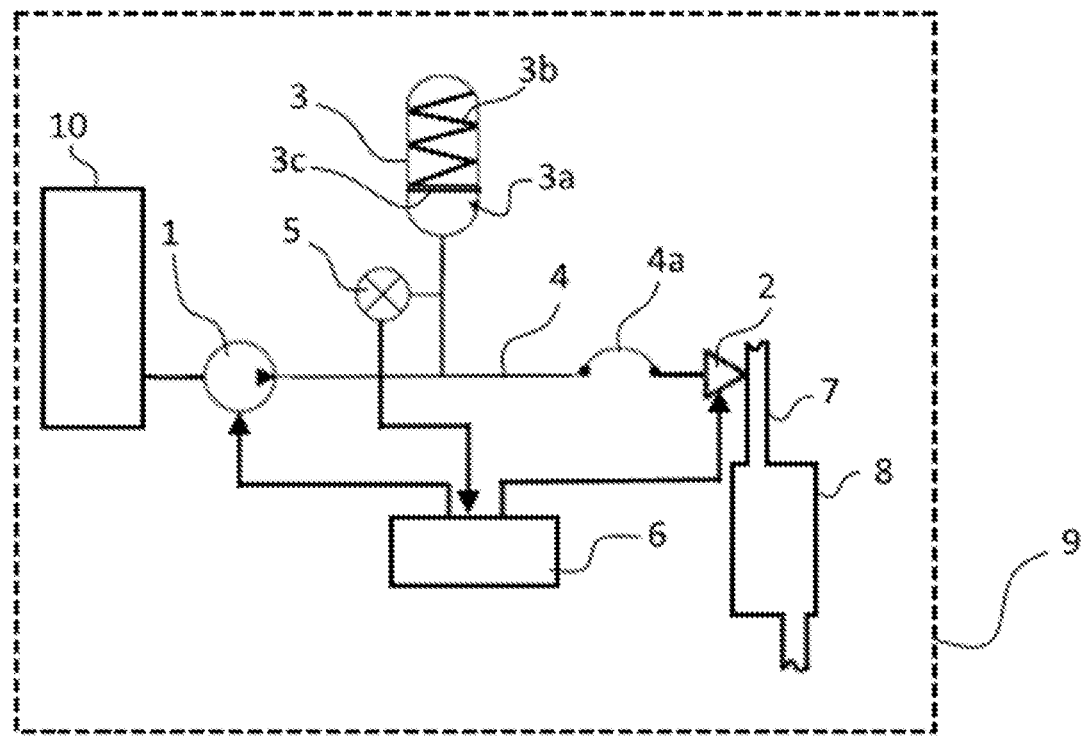
[Fig. 2]
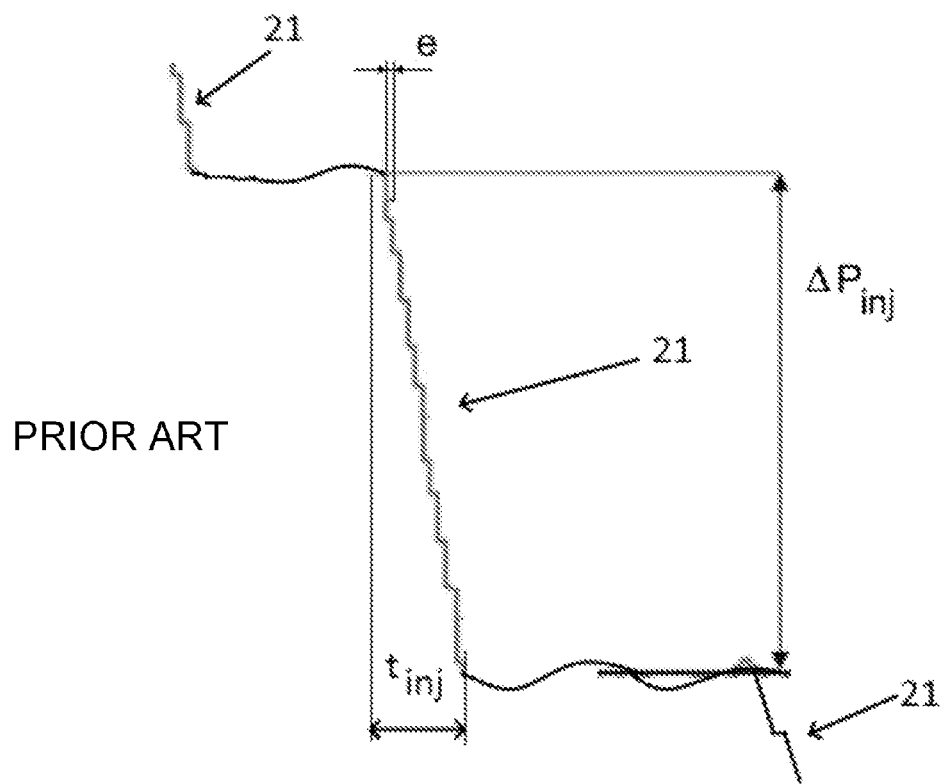
PRIOR ART

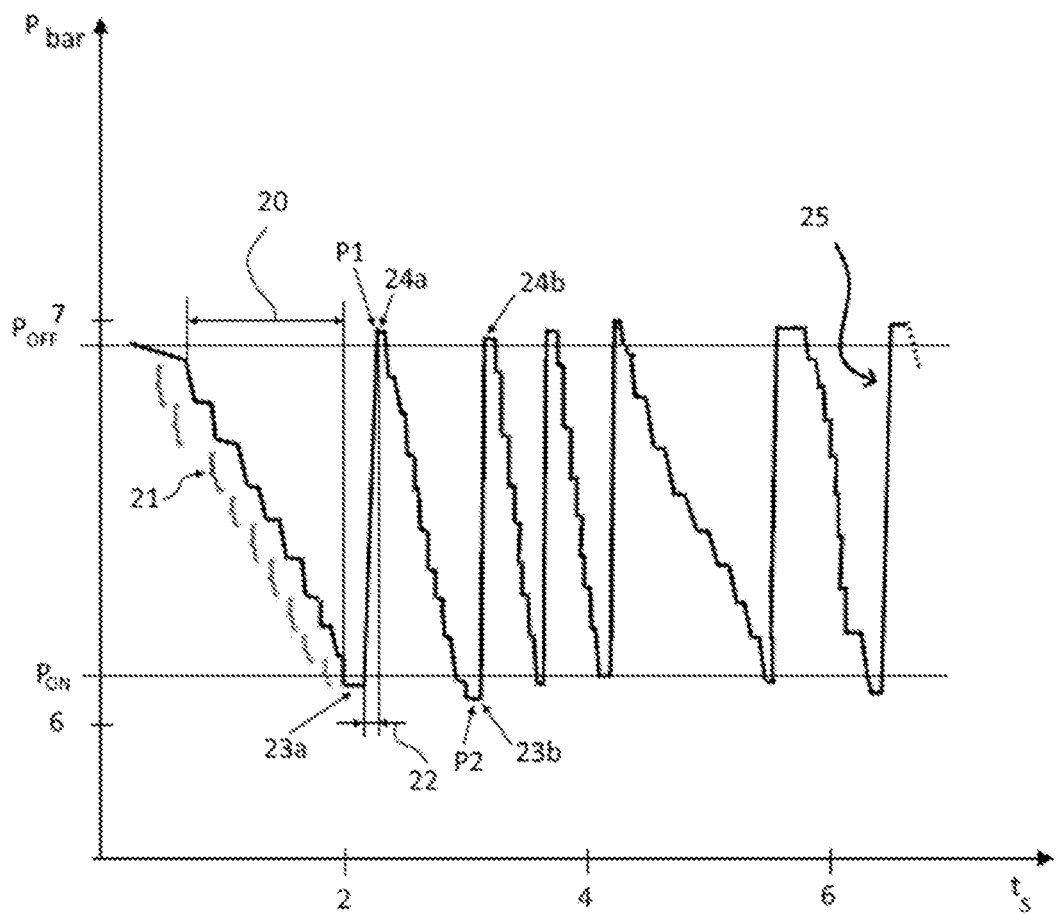
[Fig. 3]

[Fig. 4]
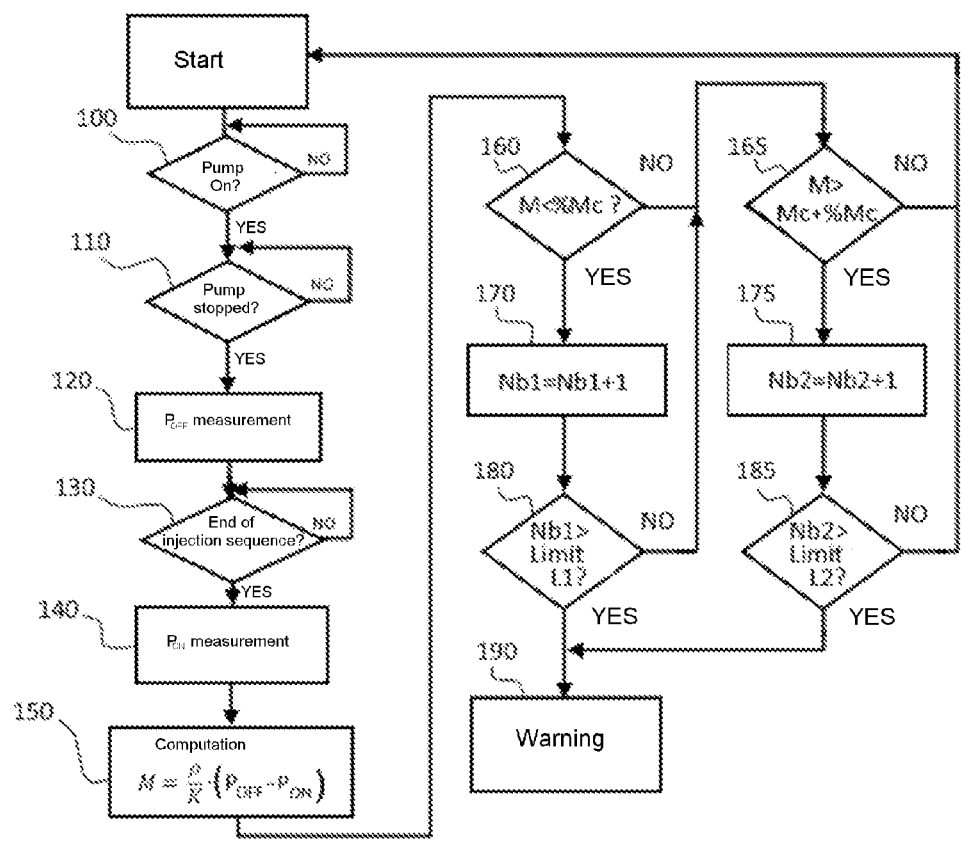
[Fig. 5A]
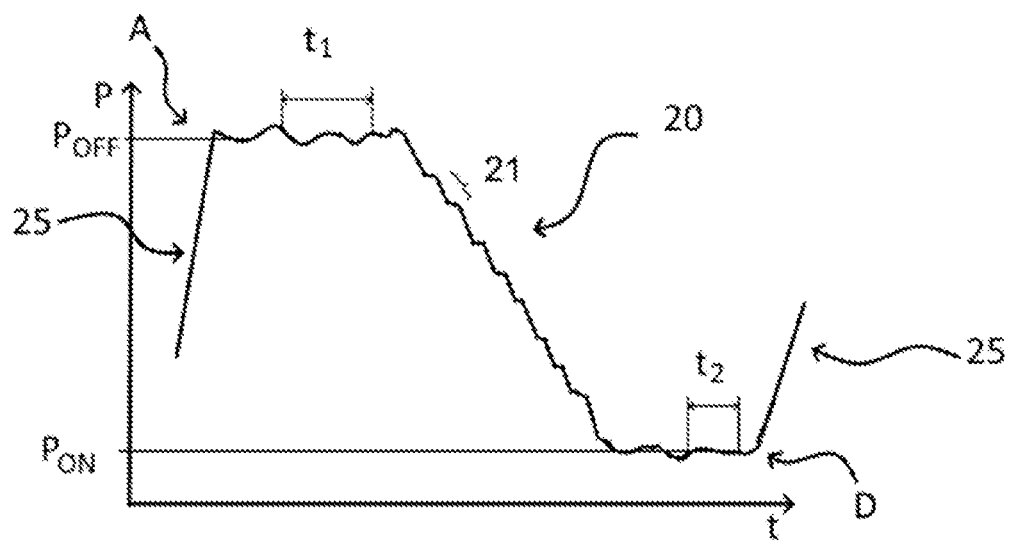

[Fig. 5B]
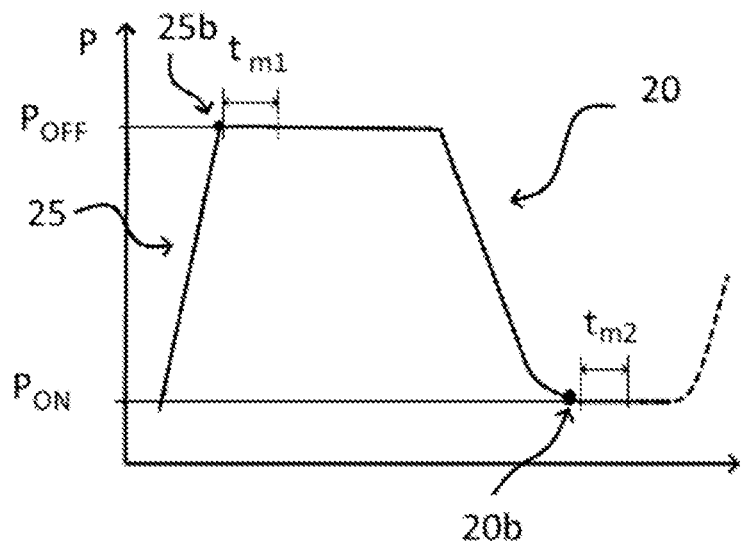
[Fig. 5C]
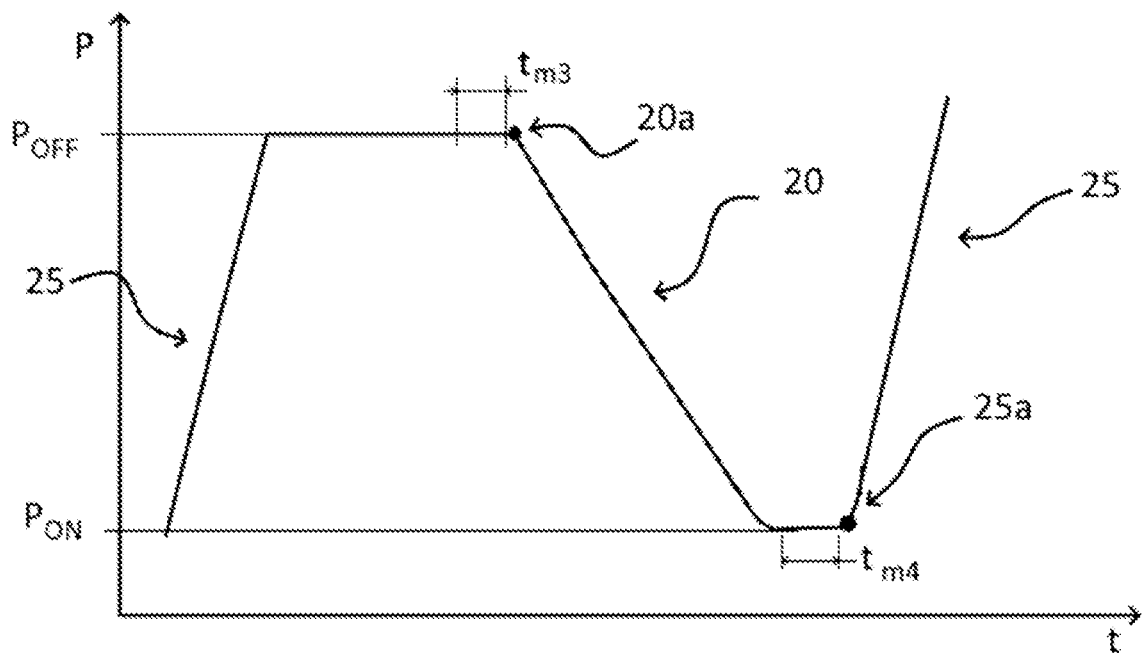

METHOD FOR MEASURING FLUID INJECTION

This application is the U.S. national phase of International Application No. PCT/EP2022/050861 filed Jan. 17, 2022, which designated the U.S. and claims priority to FR Patent Application No. 2100610 filed Jan. 22, 2021, the entire contents of each of which are hereby incorporated by reference.

TECHNICAL FIELD

The present disclosure relates to the field of selective catalytic reduction (SCR) systems for diesel engines and in particular relates to urea injection devices, upstream of an exhaust catalyst of a diesel vehicle, which comprise an accumulator with relatively low hydraulic stiffness.

PRIOR ART

For these injection devices, the amount of urea injected upstream of the catalyst needs to be measured, in particular with a view to establishing a diagnosis concerning the correct operation of the device and to detecting failures such as a partially clogged urea injector.

A urea injection device of the known type according to FIG. 1 comprises a hydraulic circuit provided with a pump 1 connected to an injector 2 through a relatively long pipe 4, and optionally provided with a flexible part 4a, and an accumulator 3 close to the pump. A pressure sensor 5 measures the pressure in the vicinity of the accumulator in order to control the operation of the pump so as to maintain the pressure in the circuit between two setpoint values, for example, a low starting pressure of the pump in the region of 4 bar to 6 bar and a stopping pressure of the pump in the region of 5 to 7 bar.

The injector injects a solution comprising urea into an exhaust duct 7 upstream of a catalyst 8 of a vehicle.

The main function of the accumulator provided with the chamber 3a, the membrane 3c and the return spring 3b, producing a back pressure in the chamber, is to contain a certain volume allowing the pump to operate intermittently so that several injections can be carried out using the volume of fluid accumulated in the chamber of the accumulator. Another function of the accumulator is to smooth any pressure peaks that follow the opening of the injector. This is achieved by providing the accumulator with low hydraulic stiffness relative to the hydraulic stiffness of the remainder of the circuit. Thus, the accumulator is also called hydraulic damper.

The pump 1 and the injector 2 are electrically controlled by an electronic computer 6, which particularly receives the pressure signal from the pressure sensor 5 and which comprises an output for controlling the opening of the injector, as well as an output for controlling the pump. For its part, the accumulator operates in a totally passive manner and to this end comprises a flexible membrane and a return spring opposing the increase in volume of the accumulator.

Typical operation is as follows. When the pressure measured by the pressure sensor reaches a minimum pressure, the computer starts the pump and the pump rapidly increases the pressure, for example, approximately 1 bar. When the maximum pressure is reached, the computer stops the pump. With the increase in pressure, the amount of fluid contained in the accumulator increases and a small amount of fluid is also stored in the circuit due to the relative elasticity of the pipes, seals or the like. Once the maximum pressure has been reached, the injector is actuated several times more or less rapidly as a function of the operating conditions of the engine until the volume of fluid in the accumulator is injected and the pressure drops to the minimum value. Then, the cycle starts again.

The amount of injected fluid is determined by computing, on the management computer of the device that knows the opening time of the injector, the periodicity of the injections, the pressure delta upon each injection on the pressure sensor and the duration of the pressure drop. Numerous tests have shown that the amount injected into such a calibrated system is very close to the setpoint and that the error remains within a range of the order of ±5%. This error originates from the variability of the components that are used, such as the injector, the accumulator or the like, their ageing and the operating conditions of the system. However, the error increases considerably in the case whereby the injector is partially clogged, and in such a case the amount of urea that is injected becomes insufficient. In order to detect such a situation, anti-pollution standards require an additional measurement of the injected amount, which is referred to as "Consumption Deviation Monitoring" (CDM).

A main objective of the measurement is to allow the system to identify situations in which the amount of injected fluid would be significantly different from the setpoint due to an injector being at least partially clogged.

In the case of an injector that is 50% obstructed by exhaust soot particles, the system injects only approximately 50% of urea and the CDM value would then be −50%.

Currently, numerous manufacturers of passenger vehicles, commercial vehicles or heavy vehicles require reliable detection of this level of −50% or even of a level of −30%, but also the detection of levels of +50% or even +30% in the case of leaking injectors.

This last value is the precision limit that the CDM function of current systems can reach and even greater precision is already sought by certain manufacturers.

The injected mass corresponds to the following equation:

$$M = \int_{P1}^{P2} \frac{\rho}{K} \cdot dP = \frac{\rho}{K} \cdot \Delta P \qquad \text{[Math. 1]}$$

where M is the injected mass in kg, $\rho$ is the density in kg/m$^3$, K is the hydraulic stiffness in Pa/m$^3$ and P is the pressure in pascals.

The hydraulic stiffness of the circuit is derived from the following equation:

$$\Delta P = K_{hyd} \cdot \Delta V \Rightarrow K_{hyd} = \frac{\Delta P}{\Delta V} = \left[\frac{Pa}{m^3}\right] \qquad \text{[Math. 2]}$$

The stiffness K of the circuit is a function of the stiffness $K_D$ of the accumulator and of the stiffness $K_I$ of the remainder of the hydraulic circuit according to the equation:

$$K_{total} = \frac{K_I \cdot K_D}{K_I + K_D} \qquad \text{[Math. 3]}$$

For the CDM computation, the stiffness is computed as a function of the dynamic response of the hydraulic circuit:

$$K = f\left(\frac{\Delta P}{\Delta t}\right) \quad \text{[Math. 4]}$$

Current methods for measuring stiffness include computing the pressure variation $\Delta P_{inj}$ divided by the time $t_{inj}$ during a pressure drop on the accumulator during unit injections 21 as described in FIG. 2.

Currently, computing the $\Delta P/\Delta t$ for each injection is highly sensitive to the sampling errors of the pressure and time signals, in addition to the digital instability of the bypass operation.

A more precise method is therefore necessary.

BRIEF DESCRIPTION OF THE INVENTION

In light of this prior art, the present application proposes an improved method for measuring the mass of injected urea firstly based on a measurement of $\Delta P$ between two pump start-ups and thus around a series of injections.

More specifically, the present invention proposes a method for measuring the mass of urea injected using a system for injecting said fluid into an exhaust system of a vehicle comprising a pump, an accumulator, a pressure sensor and a circuit distributing the fluid to an injector, with the pump and the injector being controlled by a computer as a function of engine operating parameters and of pressure measurements on the pressure sensor and in which injecting the fluid comprises sequences of series of injections of the fluid contained in the accumulator between sequences for starting the pump upon detection of a pressure below a threshold $P_{ON}$ and sequences for stopping the pump upon detection of a pressure above a threshold $P_{OFF}$ between two sequences of series of injections, which comprises measuring the pressure after the pump has stopped before starting an injection sequence, measuring the pressure after the completion of the injection sequence and before starting the pump, computing the injected mass according to the formula:

$$M = \frac{\rho}{K} \cdot (P_{OFF} - P_{ON}) \quad \text{[Math. 5]}$$

where $\rho$ is the density of the fluid in kg/m³ and K is the complete circuit hydraulic stiffness in Pa/m³ and where K is computed on the basis of the formula:

$$K = \frac{K_I \cdot K_D}{K_I + K_D} \quad \text{[Math. 6]}$$

where $K_D$ is the hydraulic stiffness of the accumulator and $K_I$ is the hydraulic stiffness of the remainder of the circuit;

and which comprises comparing the computed injected mass with a setpoint injected mass.

The method of the invention thus proposes a measurement method that is more precise than the known methods and that is based on measurements of pressures between two refills of the accumulator by the pump in order to compute the injected mass over a series of injections.

The method advantageously comprises triggering a warning device in case the measured injected mass is less than a given percentage of the setpoint injected mass over a determined number of measurements, which allows, for example, a partially clogged injector to be detected.

The method can also comprise triggering a warning device in case the injected mass is greater than a given percentage of the setpoint injected mass over a determined number of measurements, for example, in order to detect a leaking injector, for example.

With $K_I$ being a datum comprising a basic value $K_{Ib}$ depending on the type of vehicle comprising the injection system, the method can comprise a step of integrating said basic value into the computer in a step of manufacturing said vehicle.

Thus, the stiffness does not need to be computed on the vehicle comprising the device.

With $K_I$ being a datum comprising a correction value $K_{Ic}$ depending on the operating temperature of the device, the method comprises an algorithm for measuring the temperature and for computing the correction $K_{Ic}$ by means of a temperature probe when said vehicle is operating.

This increases the precision of the measurement.

The method can comprise an algorithm for determining the threshold $P_{OFF}$ comprising averaging the pressure of the pressure sensor over a time interval $t_1$ after the pump is cutoff by the computer and before starting the injection sequence and comprising an algorithm for determining the threshold $P_{ON}$ comprising averaging the pressure provided by the pressure sensor over a time interval $t_2$ between the measurement of the threshold $P_{ON}$ and a command by the computer for starting the pump.

Thus, the start and end of measurement pressures are averaged, which avoids false detections.

The method can comprise an algorithm for determining the threshold $P_{OFF}$ designed to detect the end of an increasing pressure gradient and to average the pressure values measured by the pressure sensor over a time interval $t_{m1}$ following the end of the increasing gradient.

The method can, alternatively or additionally, comprise an algorithm for determining the threshold $P_{OFF}$ designed to detect the start of a decreasing pressure gradient and to average the pressure values measured by the pressure sensor over a time interval $t_{m3}$ before this start of a decreasing gradient.

The method can also comprise an algorithm for determining the threshold $P_{ON}$ designed to detect the end of a decreasing pressure gradient as well as to average the pressure values measured by the pressure sensor over a time interval $t_{m2}$ following the end of the decreasing gradient, respectively.

Alternatively or additionally, the method can comprise an algorithm for determining the detection of the start of an increasing gradient and for averaging pressure values measured by the pressure sensor over a time interval $t_{m4}$ before the start of the increasing gradient.

These various methods for detecting $P_{ON}$ and $P_{OFF}$ can allow the detection of the $P_{ON}$ and $P_{OFF}$ thresholds to be refined.

The method can comprise measuring the stiffness $K_D$ of the accumulator carried out when manufacturing the accumulator and integrating this measurement in a non-volatile memory of said computer in a step of manufacturing said vehicle. This allows the accumulators and the computers to be matched.

According to an alternative embodiment, the method can comprise storing, in a non-volatile memory of computers of a plurality of vehicles, an average value of the stiffness $K_D$ of a series of produced accumulators.

The method can comprise a periodic measurement of $K_I$ by carrying out pump stopping and injection events at a pressure lower than the minimum pressure opening the accumulator for a calibrated duration corresponding to a calibrated injected volume and by measuring ΔP over said calibrated duration in order to compute $K_I$.

This yields a basic value of $K_I$, $K_D$ not taken into account for this measurement.

The invention can also comprise a computer program product comprising program code instructions recorded on a computer-readable medium for implementing the steps of the method as described above when said program is executed by the computer of a vehicle.

The invention further relates to a non-transitory computer-readable recording medium, on which a computer program is recorded comprising program code instructions for implementing the steps of the method as described above.

BRIEF DESCRIPTION OF THE DRAWINGS

Further features, details and advantages of the invention will become apparent upon reading the following detailed description of non-limiting embodiments, and with reference to the accompanying drawings, in which:

FIG. 1 shows a schematic view of an injection system to which the method of the invention applies;

FIG. 2 shows a graph representing two methods of the prior art;

FIG. 3 shows a graph representing a measurement according to the method of the invention;

FIG. 4 shows an example of a flowchart of a method of the invention;

FIG. 5A shows a first example of pressure measurements within the scope of the method of the invention;

FIG. 5B shows a second example of pressure measurements within the scope of the method of the invention;

FIG. 5C shows a third example of pressure measurements within the scope of the method of the invention.

DESCRIPTION OF THE EMBODIMENTS

The drawings and the description hereafter contain elements that can not only be used to better understand the present invention, but also contribute to its definition, where appropriate.

Reference will now be made to FIG. 1, which shows a system for injecting a fluid containing urea into an exhaust system of a vehicle 9 provided with a tube 7, into which the injector 2 emerges, and a catalyst 8, in which the urea will allow NOx molecules to be reduced. The system comprises a pump 1 that pumps the fluid from a tank 10, an accumulator 3, a pressure sensor 5 and a circuit 4, 4a distributing the fluid from the pump to an injector 2, with the pump 1 and the injector 2 being controlled by a computer 6 as a function of engine operating parameters and of pressure measurements on the pressure sensor 5.

According to FIG. 3, in this system, injecting fluid comprises sequences 20 of series of injections 21 of fluid contained in the accumulator between sequences 23a, 23b for starting the pump upon detection of a pressure below a threshold $P_{ON}$ (ON for starting) and sequences 24a, 24b for stopping the pump upon detection of a pressure above a threshold $P_{OFF}$ (OFF for stopping) in order to refill the accumulator with the pressure increase 25.

The opening durations of the injectors are of the order of 20 ms to 40 ms and the pressure drop lasts from 50 ms to 150 ms depending on the flexibility of the system and its inertia. Each injection causes a pressure drop of the order of 100 mbar. Their number and frequency particularly depends on the engine load and on the engine speed. Within this context, FIG. 3 relates to a case where the injections are generally very close together, which corresponds to an engine speed and/or a high engine load.

The pump is started for a pressure 23 of the order of 6 bar and stops for a pressure 24 of the order of 7 bar. It should be noted that these values are approximate and not very precise when the injections are very close together, as in the example shown.

The method comprises, as shown in FIG. 4, initializing with a running pump test 100 and then a stopped pump test 110 for taking a measurement 120 of the pressure P1 after the pump has stopped, for example, at point 24a of FIG. 3 before the start of an injection sequence, searching for an end of injection sequence 130, for example, at point 23b and before starting the pump, measuring 140 the pressure $P_{ON}$ and computing 150 the injected mass according to the formula provided above:

$$M = \frac{\rho}{K} \cdot (P_{OFF} - P_{ON}) \qquad \text{[Math. 7]}$$

where ρ is the density of the fluid in kg/m³ and K is the complete circuit hydraulic stiffness in Pa/m³ and where K is computed on the basis of the formula provided above:

$$K = \frac{K_I \cdot K_D}{K_I + K_D} \qquad \text{[Math. 8]}$$

where $K_D$ is the hydraulic stiffness of the accumulator and $K_I$ is the hydraulic stiffness of the remainder of the circuit.

Still according to FIG. 4, the method comprises comparing 160 the computed injected mass with a percentage of the setpoint injected mass programmed in the computer, for example, 70% for detecting a repeated drop of 30% of the injected mass.

This comparison is followed by a test 180 carried out by comparing the number Nb1 of detections of differences between the computed injected mass and the setpoint mass against a limit L1 and, if this number exceeds said limit, the system triggers an alarm 190, according to which the system can no longer supply the amount of urea required to sufficiently reduce the pollutants.

Still according to FIG. 4, a second test 165 will compare the injected mass with an upper limit corresponding to the setpoint mass plus a percentage thereof, for example, +30%. This test will trigger an alarm 190 if the fault recurs over a number of occurrences Nb2 above a limit L2 according to the test 185.

This will provide an indication in case the device injects too much urea, which can cause ammonia to be generated.

Therefore, the invention is not dependent on a pressure measurement for each injection, which increases the precision of the measurement and allows the function of monitoring the correct operation of the urea injection device to meet more stringent standards.

Indeed, in the method of the invention, the value ΔP of the unit injections 21 does not need to be computed, which reduces any measurement errors. Furthermore, $P_{OFF}$ and $P_{ON}$ can be determined by respectively averaging the measurement provided by the pressure sensor within an interval $t_1$ after stopping the pump for the value $P_{OFF}$ following the pressure increase 25 and within an interval $t_2$ before starting the pump for the value $P_{ON}$ after a series of injections 20 in order to have a more precise value taking into account the noise at the sensor, as shown in FIG. 5A.

It is also possible, as shown in FIG. 5B, to determine when to measure the value of the pressure sensor in order to determine the pressure $P_{OFF}$ by means of a first algorithm, which, on the basis of the pressure measurements of the sensor 5, detects the end 25b of an increasing pressure gradient for the pressure measurement $P_{OFF}$ following the pressure increase 25. This algorithm can then average the measured pressure over a given time interval $t_{m1}$ after the end 25b of the increasing pressure gradient 25.

In order to measure the pressure $P_{ON}$, the method can comprise a second algorithm, which, on the basis of the pressure measurements of the sensor 5, detects the end 20b of a decreasing pressure gradient before starting the pump after the series of injections 20.

This second algorithm can then comprise averaging the pressure over a duration $t_{m2}$ after the end 20b of the decreasing pressure gradient 20.

The averages typically can be taken over a duration of 20 ms to 40 ms or on a given number of samples, for example, 5 to 10 samples after the event for triggering the measurement.

According to FIG. 5C, the measurement also can be carried out by a third measurement algorithm, still with the pressure sensor 5, which detects the start 20a of a decreasing pressure gradient 20 after a pressure increase 25 in order to detect the threshold $P_{OFF}$. In this case, the pressure will be averaged over previous stored measurements taken for a duration $t_{m3}$ before the start of the decreasing gradient.

In order to measure $P_{ON}$, a fourth measurement algorithm can comprise detecting the start 25a of an increasing pressure gradient 25 after a series of injections 20. In this case, the pressure $P_{ON}$ will be averaged over the stored measurements for a duration $t_{m4}$ before the start of the increasing gradient.

The averages also can be taken on a given number of samples stored before these events.

Here again, the averages typically can take place over a duration of 20 ms to 40 ms or on a number of samples ranging from 5 to 10 samples.

A combination of these methods can be used, for example, as a function of the engine operating phases in order to increase the precision of the measurement and the computation of ΔP.

The invention requires knowledge of $K_D$ and, to this end, $K_D$ is, for example, determined by measuring, under quasi-static conditions, the relationship between the hydraulic movement of the accumulator and the pressure. This is carried out on a measuring test bench at the end of the production line of the accumulators that are fully tested.

The data for each accumulator can be stored in a database and retrieved when manufacturing the vehicle or printed on a bar code or the like on each accumulator and read automatically in order to be integrated into the computer of the vehicle receiving the respective accumulator.

For a less efficient system, it is possible to measure the average of the stiffnesses of a series of accumulators and to introduce it into a corresponding series of vehicle computers. Since in such a case the error is less than +/−10%, this method remains acceptable for improving the CDM function compared to the prior art.

The total injected mass of the fluid and therefore of the urea is simply computed by adding the masses of the measurements carried out between the pump stopping and the pump starting events by comparing the values defined for each injection over several dozen injections with the sum.

Another element to be known is the value of $K_I$, namely the stiffness of the remainder of the circuit. This stiffness comprises a first component $K_{Ib}$ that depends on the hydraulic circuit of the vehicle, lines, seals, hoses, etc., and on the fluid and that is practically identical for all the vehicles of the same model and does not need to be recomputed. This value can be introduced into the computer for all vehicles of the same type. It can be precisely determined during a test with the complete system without the accumulator, which is replaced by a plug. The test comprises, for example, a conventional pressure measurement test without the accumulator. The stiffness $K_I$ further comprises a second component $K_{Ic}$ depending on the operating temperature of the device that can be determined for a type of vehicle by carrying out the aforementioned test in a climate chamber at several temperatures in order to be able integrate its law of variation into the computer.

Another parameter that can falsify the measurements is the presence of air bubbles in the circuit, in particular when starting the system, which significantly modifies the value of $K_I$ and falsifies the measurements. Furthermore, the measurement is deactivated for a determined period after starting the engine of the vehicle in order to allow time for the air bubbles to be discharged that are possibly present in the circuit after it is purged when the engine is stopped.

It is also possible to periodically measure $K_I$ in order to increase the precision of the measurement. To this end, it is possible to carry out injections at a pressure lower than the opening pressure of the accumulator and to measure the pressure after a given number of injections to be compared with a prior measurement on a test bench.

This measurement, which is based on the measurement of an ΔP over a calibrated duration without influence from the accumulator, allows the stiffness $K_I$ to be corrected by taking into account the amount of air actually present in the circuit by using the values of ΔP and Δt obtained during these injections at a lower pressure in order to estimate the amount of air present in the system.

The method described is therefore suitable for increasing the precision of the CDM measurement. The invention is not limited to the examples described and, in particular, by averaging the measured values over several stop-start cycles of the pump it offers even better precision.

The invention claimed is:

1. A method for measuring the injected mass of a fluid containing urea using a system for injecting said fluid into an exhaust system of a vehicle comprising a pump, an accumulator, a pressure sensor and a circuit distributing the fluid to an injector, with the pump and the injector being controlled by a computer as a function of engine operating parameters and of pressure measurements on the pressure sensor and in which injecting the fluid comprises sequences of series of injections of fluid contained in the accumulator between sequences for starting the pump upon detection of a pressure below a threshold $P_{ON}$ and sequences for stopping the pump upon detection of a pressure above a threshold $P_{OFF}$, the method comprising:

measuring the pressure after the pump has stopped before starting an injection sequence;

measuring the pressure after the completion of the injection sequence and before starting the pump;

computing the injected mass according to the formula:

$$M = \frac{\rho}{K} \cdot (P_{OFF} - P_{ON})$$ [Math. 9]

where ρ is the density of the fluid in kg/m³ and K is the complete circuit hydraulic stiffness in Pa/m³ and where K is computed on the basis of the formula:

$$K = \frac{K_I \cdot K_D}{K_I + K_D}$$ [Math. 10]

where $K_D$ is the hydraulic stiffness of the accumulator and $K_I$ is the hydraulic stiffness of the remainder of the circuit; and comparing the computed injected mass with a setpoint injected mass.

2. The method for measuring the injected mass of a fluid containing urea as claimed in claim 1, wherein, with $K_I$ being a datum comprising a basic value $K_{Ib}$ depending on the type of vehicle comprising the injection system, the method comprises a step of integrating said basic value into the computer in a step of manufacturing said vehicle.

3. The method for measuring the injected mass of a fluid containing urea as claimed in claim 1, further comprising triggering a warning device in case the measured injected mass is less than a given percentage of the setpoint injected mass over a determined number of measurements.

4. The method for measuring the injected mass of a fluid containing urea as claimed in claim 1, further comprising triggering a warning device in case the injected mass is greater than a given percentage of the setpoint injected mass over a determined number of measurements.

5. The method for measuring the injected mass of a fluid containing urea as claimed in claim 3, wherein, with $K_I$ being a datum comprising a correction value $K_{Ic}$ depending on the operating temperature of the device, the method further comprises an algorithm for measuring temperature and for computing the correction $K_{Ic}$ by means of a temperature probe when said vehicle is operating.

6. The method for measuring the injected mass of a fluid containing urea as claimed in claim 1, further comprising an algorithm for determining the threshold $P_{OFF}$ comprising averaging the pressure of the pressure sensor over a time interval $t_1$ after the pump is cutoff by the computer and before starting an injection sequence following this cutoff and/or comprising an algorithm for determining the threshold $P_{ON}$ comprising averaging the pressure measurements taken by the pressure sensor over a time interval $t_2$ before a command by the computer for starting the pump.

7. The method for measuring the injected mass of a fluid containing urea as claimed in claim 1, further comprising an algorithm for determining the threshold $P_{OFF}$ designed to detect the end of an increasing pressure gradient and to average the pressure values measured by the pressure sensor over a time interval $t_{m1}$ following the end of the increasing gradient and/or comprising an algorithm for determining the threshold $P_{ON}$ designed to detect the end of a decreasing pressure gradient as well as to average the pressure values measured by the pressure sensor over a time interval $t_{m2}$ following the end of the decreasing gradient, respectively.

8. The method for measuring the injected mass of a fluid containing urea as claimed in claim 1, further comprising an algorithm for determining the threshold $P_{OFF}$ designed to detect the start of a decreasing pressure gradient and to average pressure values measured over a time $t_{m3}$ before this start of a decreasing gradient and/or comprising an algorithm for determining a detection of a start of an increasing gradient and for averaging pressure values measured by the pressure sensor over a time interval $t_{m4}$ before the start of the increasing gradient.

9. The method for measuring the injected mass of a fluid containing urea as claimed in claim 1, further comprising a periodic measurement of $K_I$ by carrying out pump stopping and injection events at a pressure lower than the minimum pressure opening the accumulator for a calibrated duration corresponding to a calibrated injected volume and by measuring ΔP over said calibrated duration in order to compute $K_I$.

10. The method for measuring the injected mass of a fluid containing urea as claimed in claim 1, further comprising measuring the stiffness $K_D$ of the accumulator carried out when manufacturing the accumulator and integrating this measurement in a non-volatile memory of said computer in a step of manufacturing said vehicle.

11. The method for measuring the injected mass of a fluid containing urea as claimed in claim 1, further comprising storing, in a non-volatile memory of computers of a plurality of vehicles, an average value of the stiffness $K_D$ of a series of produced accumulators.

12. A non-transitory computer-readable medium on which is stored a computer program product comprising program code instructions that, when executed by the computer of a vehicle, cause the computer to execute the method of claim 1.

13. The method for measuring the injected mass of a fluid containing urea as claimed in claim 2, further comprising triggering a warning device in case the measured injected mass is less than a given percentage of the setpoint injected mass over a determined number of measurements.

14. The method for measuring the injected mass of a fluid containing urea as claimed in claim 2, further comprising triggering a warning device in case the injected mass is greater than a given percentage of the setpoint injected mass over a determined number of measurements.

15. The method for measuring the injected mass of a fluid containing urea as claimed in claim 4, wherein, with $K_I$ being a datum comprising a correction value $K_{Ic}$ depending on the operating temperature of the device, the method comprises an algorithm for measuring temperature and for computing the correction $K_{Ic}$ by means of a temperature probe when said vehicle is operating.

16. The method for measuring the injected mass of a fluid containing urea as claimed in claim 2, further comprising an algorithm for determining the threshold $P_{OFF}$ comprising averaging the pressure of the pressure sensor over a time interval $t_1$ after the pump is cutoff by the computer and before starting an injection sequence following this cutoff and/or comprising an algorithm for determining the threshold $P_{ON}$ comprising averaging the pressure measurements taken by the pressure sensor over a time interval $t_2$ before a command by the computer for starting the pump.

17. The method for measuring the injected mass of a fluid containing urea as claimed in claim 3, further comprising an algorithm for determining the threshold $P_{OFF}$ comprising averaging the pressure of the pressure sensor over a time interval $t_1$ after the pump is cutoff by the computer and before starting an injection sequence following this cutoff and/or comprising an algorithm for determining the threshold $P_{ON}$ comprising averaging the pressure measurements taken by the pressure sensor over a time interval $t_2$ before a command by the computer for starting the pump.

18. The method for measuring the injected mass of a fluid containing urea as claimed in claim 4, further comprising an algorithm for determining the threshold $P_{OFF}$ comprising averaging the pressure of the pressure sensor over a time interval $t_1$ after the pump is cutoff by the computer and before starting an injection sequence following this cutoff and/or comprising an algorithm for determining the threshold $P_{ON}$ comprising averaging the pressure measurements taken by the pressure sensor over a time interval $t_2$ before a command by the computer for starting the pump.

19. The method for measuring the injected mass of a fluid containing urea as claimed in claim 5, further comprising an algorithm for determining the threshold $P_{OFF}$ comprising averaging the pressure of the pressure sensor over a time interval $t_1$ after the pump is cutoff by the computer and before starting an injection sequence following this cutoff and/or comprising an algorithm for determining the threshold $P_{ON}$ comprising averaging the pressure measurements taken by the pressure sensor over a time interval $t_2$ before a command by the computer for starting the pump.

20. The method for measuring the injected mass of a fluid containing urea as claimed in claim 2, further comprising an algorithm for determining the threshold $P_{OFF}$ designed to detect the end of an increasing pressure gradient and to average the pressure values measured by the pressure sensor over a time interval $t_{m1}$ following the end of the increasing gradient and/or comprising an algorithm for determining the threshold $P_{ON}$ designed to detect the end of a decreasing pressure gradient as well as to average the pressure values measured by the pressure sensor over a time interval $t_{m2}$ following the end of the decreasing gradient, respectively.

* * * * *